Figure 18:
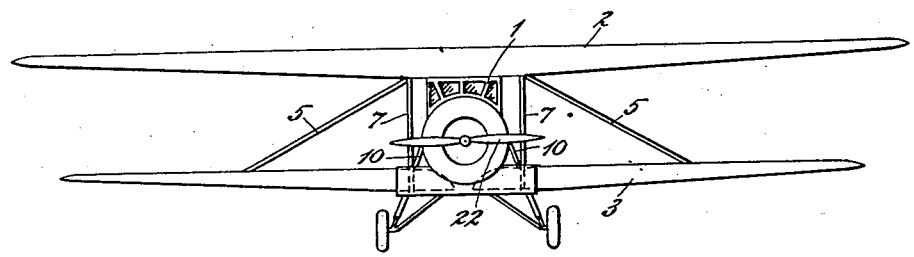

Feb. 17, 1931.   I. ANDERSSON   1,793,349
AIRPLANE
Filed March 6, 1929   6 Sheets-Sheet 1
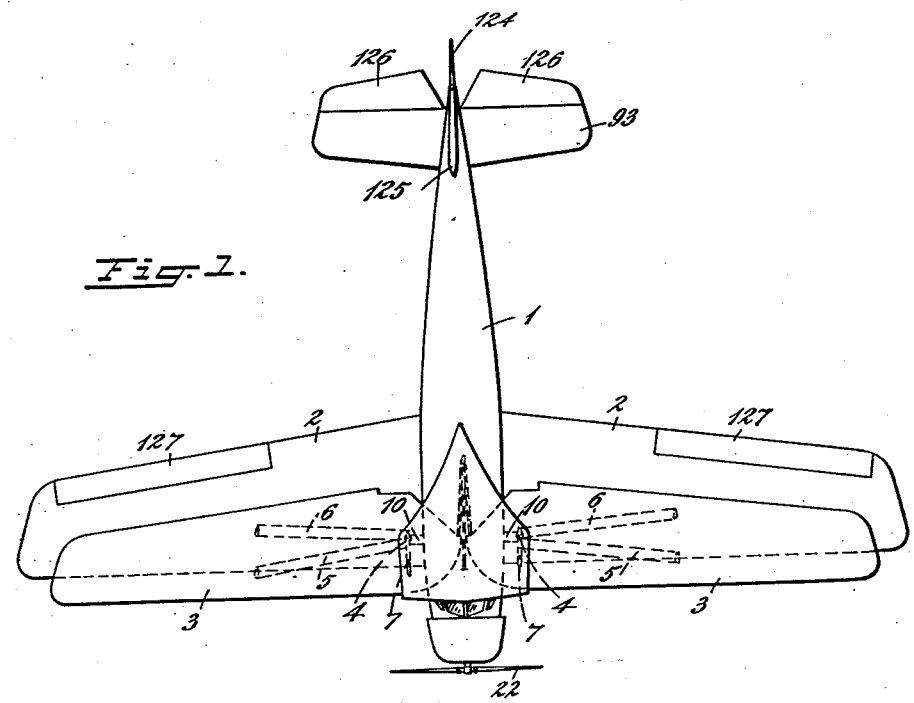
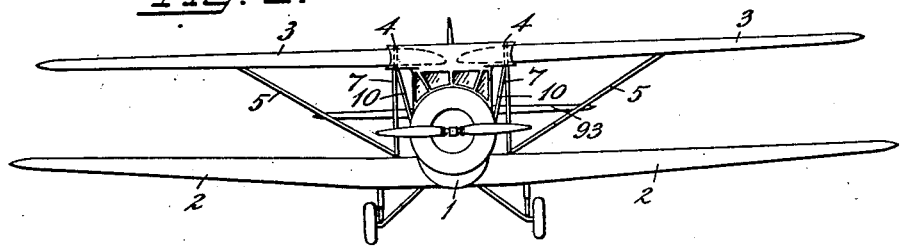
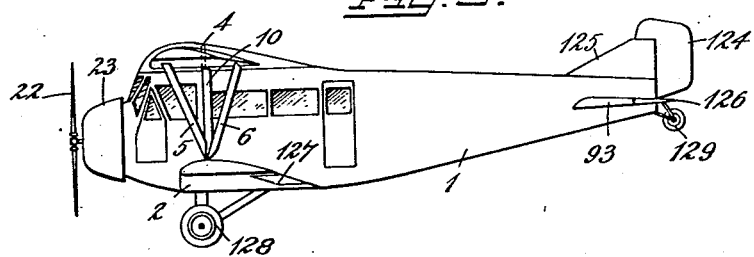
INVENTOR.

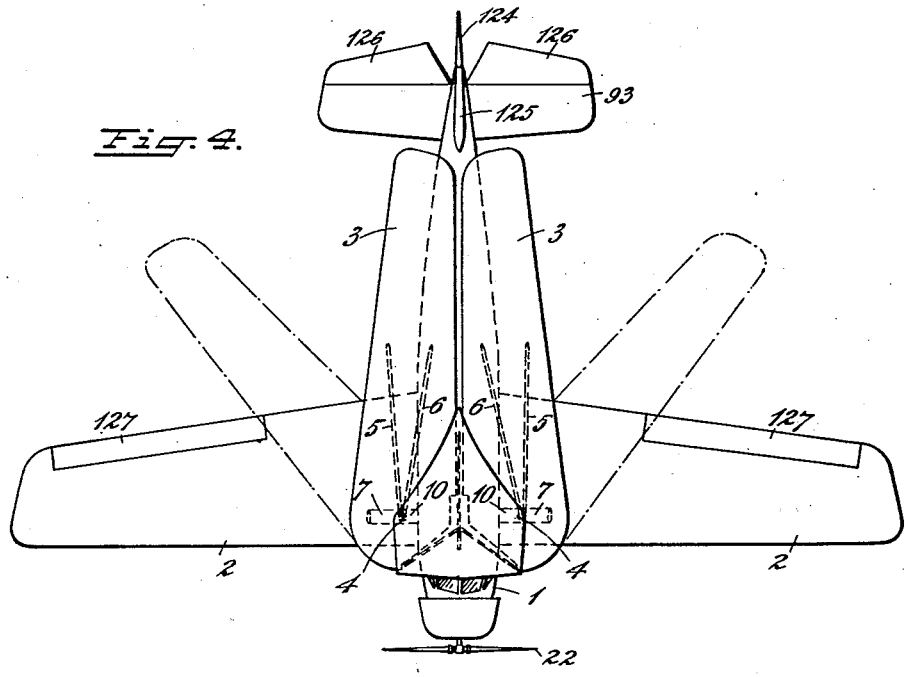
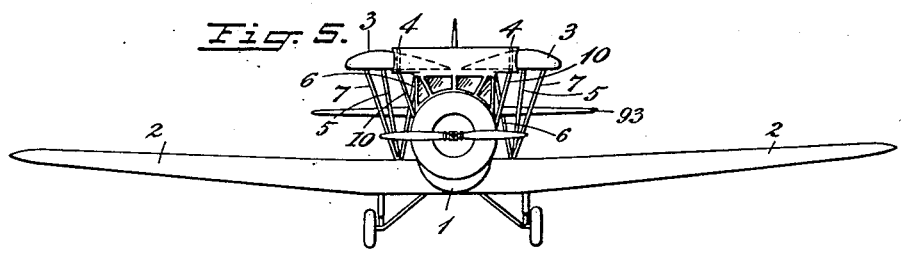
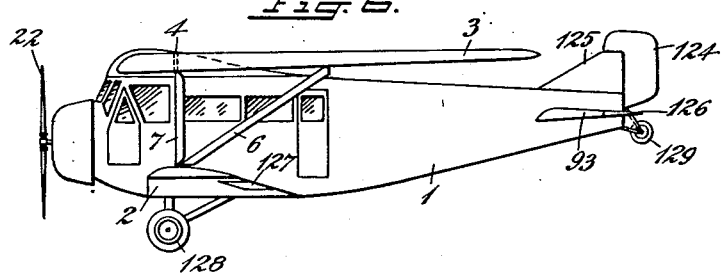

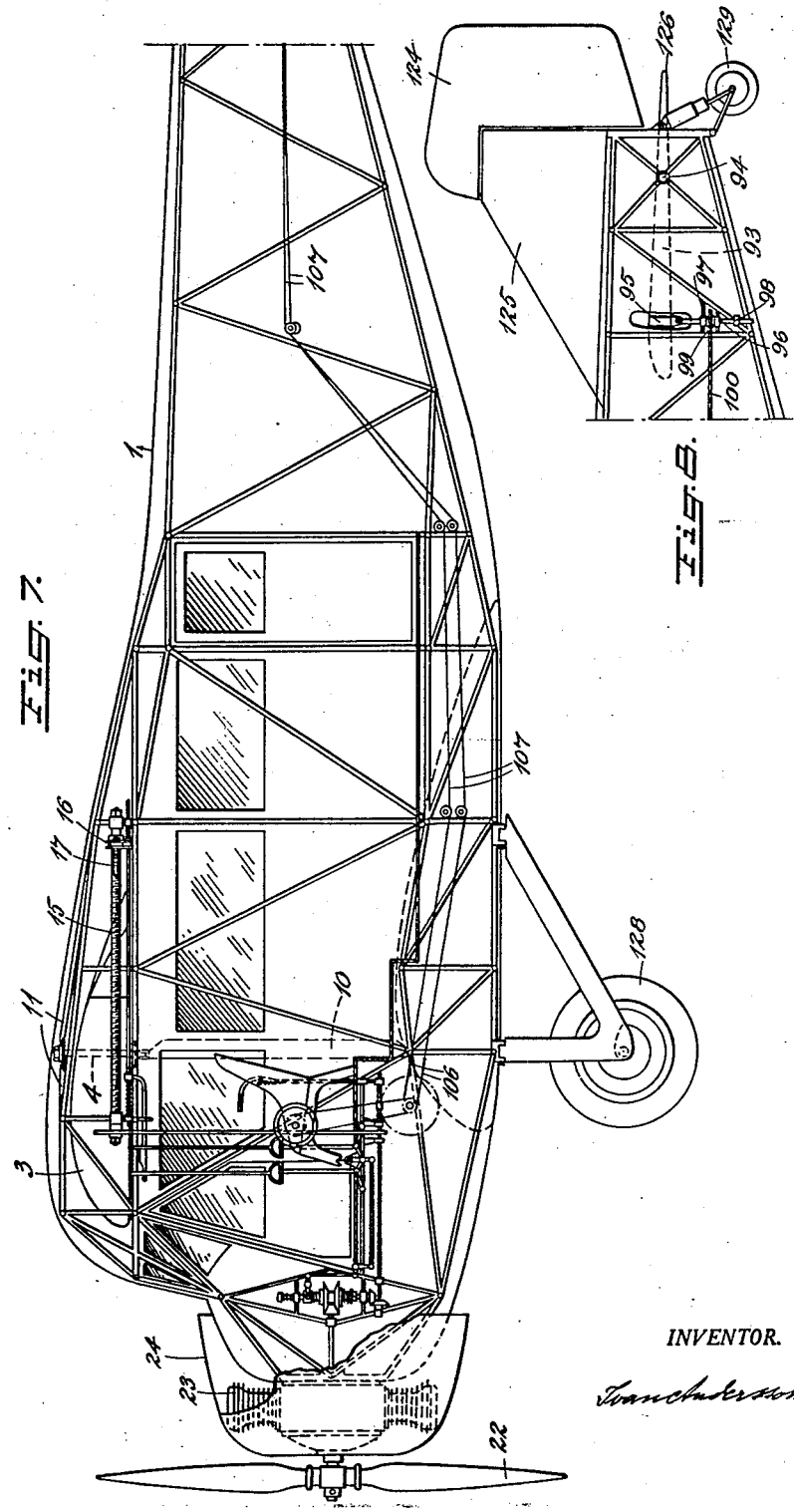

Feb. 17, 1931.  I. ANDERSSON  1,793,349
AIRPLANE
Filed March 6, 1929   6 Sheets-Sheet 4
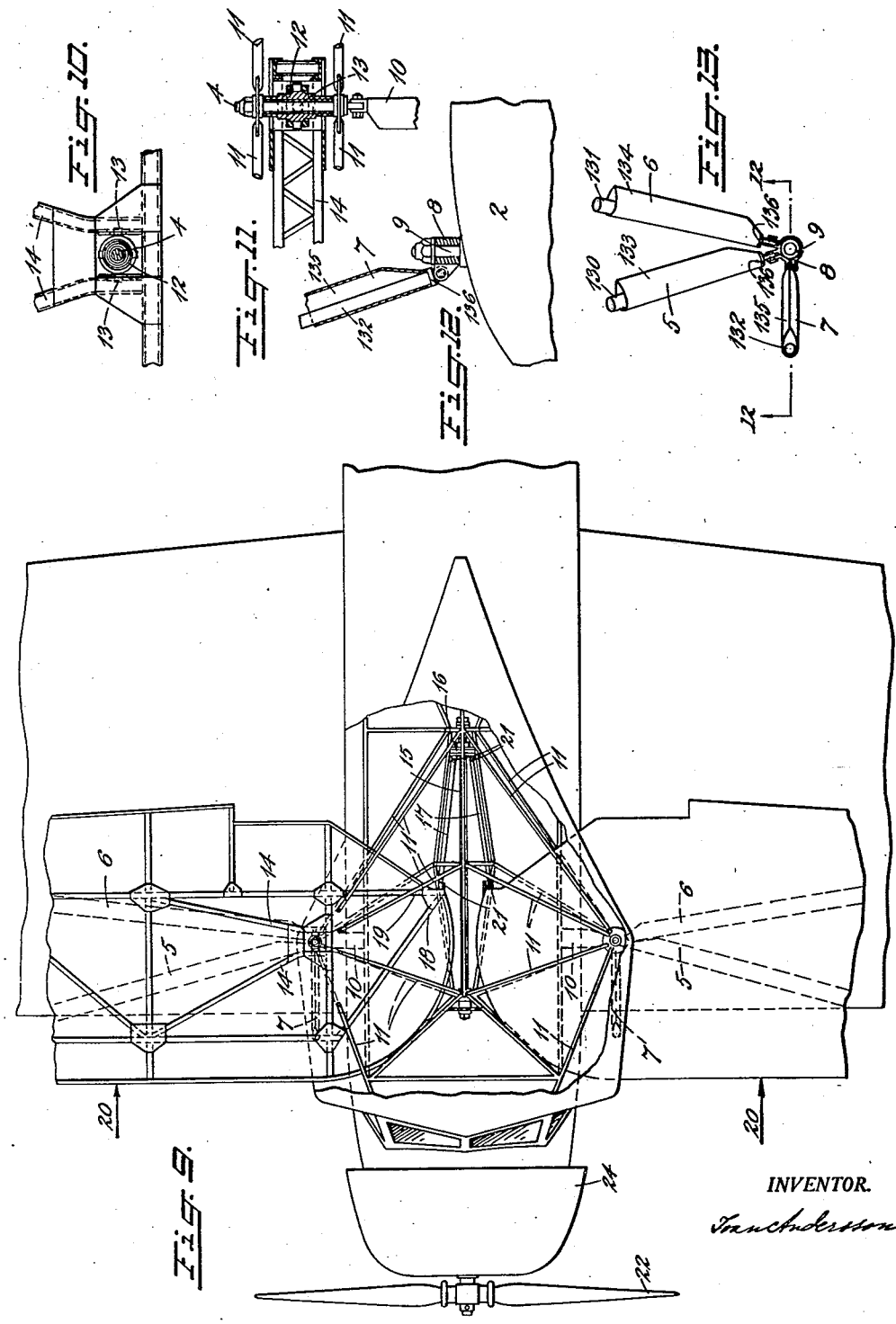
INVENTOR.

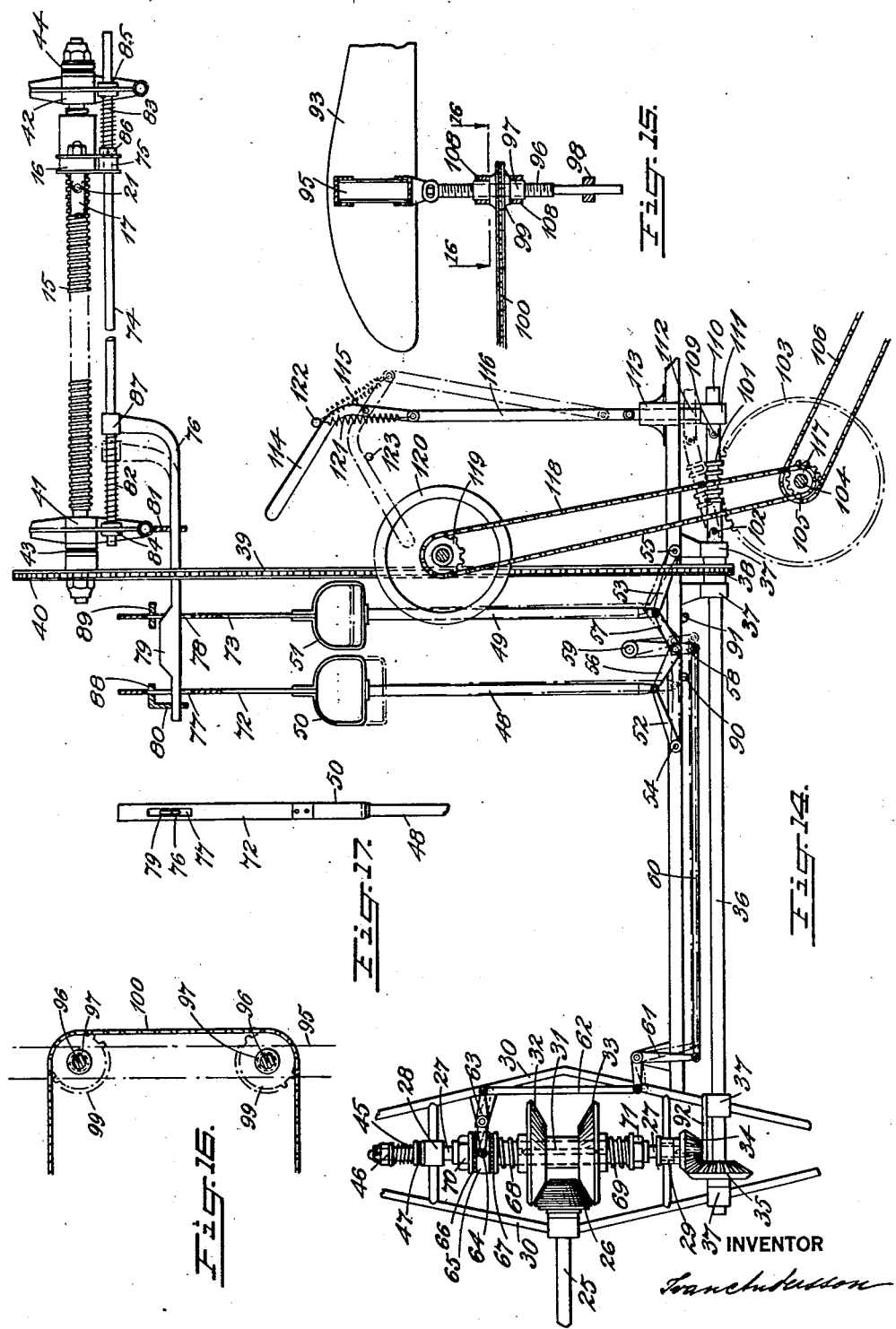

INVENTOR

Patented Feb. 17, 1931

1,793,349

UNITED STATES PATENT OFFICE

IVAN ANDERSSON, OF LONG ISLAND CITY, NEW YORK

AIRPLANE

Application filed March 6, 1929. Serial No. 344,628.

The present invention refers to improvements in airplanes and has for its object to increase the speed range. This is of great advantage in transport airplanes, where it is desirable to fly at a high speed, but most important to be able to start and land at a low and safe speed.

The speed of an airplane bears a certain relation to the wing loading. With a larger load per unit area of supporting surface greater speeds are attained, and with a smaller load per unit area of supporting surface lower speeds result. With given characteristics of an airplane, i. e. the power output, aerofoil section, head resistance and weight, the speed-range depends on the supporting area, so that for a small supporting area of the said plane the speed range will be higher up, as for example it may be between 60 and 125 miles per hour. But for a large supporting area the speed range will be lower down, for example it may be between 35 and 90 miles per hour.

These figures are not definite and are only given as an example to illustrate what is here meant by higher and lower speed range. The object of this invention is to provide means whereby for example the two said speed ranges can be obtained by one and the same airplane, so that it can travel at the highest speed of the high speed range and at the lowest speed, of the low speed range. This is accomplished, according to this invention by varying the effective supporting area of the airplane during flight.

To enable the effective supporting area to be changed, an airplane according to this invention carries at least two sets of wings, preferably one set mounted above the other, the one set being permanently fixed to the body. The other set of wings which may be mounted above or below the first said set of wings are so arranged that the wings may be rotated in a horizontal plane during flight. When the last said wings are rotated to a point where the chords are perpendicular to the line of flight and the span parallel with the line of flight, these wings cease to be supporting surfaces and will now more or less act as streamline bodies and not as aerofoils. Therefore the load is now mainly carried by the fixed wings, that is on a reduced supporting area, enabling higher speed to be attained. It is obvious that the drag has also been reduced, thereby aiding the high speed. If however the movable wings are rotated so that the chord is parallel with the line of flight and the span perpendicular to the line of flight the supporting area has been increased, thereby enabling the plane to be flown at lower speeds.

The accompanying drawings illustrate the invention where:

Figures 1, 2 and 3 show a plan view, front view and side view respectively of an airplane embodying this invention with the movable wings in a position for low speeds, Figures 4, 5 and 6 show a plan view, a front view and a side view of the same airplane with the movable wings in a position for high speed, Figures 7 and 8 are vertical longitudinal sections through the body showing the mechanism for rotating the movable wings and for automatic adjustment of the stabilizer, Figure 9 is a fractional plan view of an airplane showing the cover partly removed from the body and one of the movable wings, disclosing the structure of the wing and connected parts of the body, Figure 10 shows in plan a pivot for the movable wing, Figure 11 is a vertical section through the pivot, Figure 12 is a vertical section on line 12—12 of Figure 13 and shows the lower connection of a strut for supporting a movable wing, Figure 13 is a plan of the same strut connection, Figure 14 shows in elevation to a larger scale the mechanism for operating the movable wings and for adjusting the stabilizer, Figure 15 shows in elevation part of a stabilizer and connected parts for adjusting it, Figure 16 is a horizontal section on line 16—16 of Figure 15, Figure 17 is a side view of a part of the operating mechanism stopping device.

Figure 19:
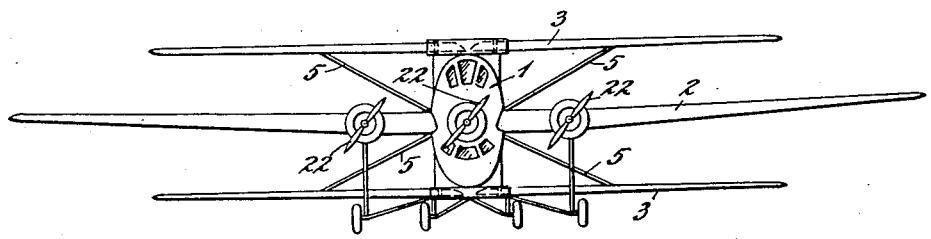

Figure 18 is a front view of an airplane with the movable wings mounted below the fixed wings, and Figure 19 is a front view of an airplane with movable wings mounted above and below the fixed wings.

In Figures 1 to 6 an example of an airplane embodying this invention is shown, 1 being the body or fuselage, 2 the fixed wings and 3 the movable wings which are pivoted at 4. Apart from being supported by the pivots 4 the movable wings are also supported by struts 5, 6 and 7, the lower ends of which are attached to a common fitting 8 on each side of the body. Said fitting is mounted on a pivot 9 (Figures 12 and 13) which is carried by the lower and fixed wings and placed below and in line with the pivots 4. This will allow the wings 3 and the supporting struts to move around the axes of the pivots together. The pivots 4 are supported from the fuselage by struts 10 and arms or structural members 11 (Figures 7, 9 and 11). The attachment of the wing to the pivot 4 is in the form of a universal joint which consists of a member 12 which turns on the pivot 4 and studs or trunnions 13 on the member 12 which rest in bearings mounted on the structural members 14 of the wing. This joint constitutes provisions to prevent any binding or undue stress being put on the pivot 4 due to load flexure of the wing.

To hold the movable wings in position, or to turn them into any desired position, there is provided a screw 15, a nut 16 and links 17, said links being connected between said nut and structural members 18 and 19 of the wings. Said members form the one arm of a lever fulcrumed at the pivot 4, the other arm consisting of the wing 3 extending outwards from the fuselage on the other side of the fulcrum. The links 17 will hold the wings in position against the horizontal components of the air pressure indicated by the arrows 20. The links are preferably attached to the nut and the wings by universal joints 21. To move the wings into any desired position the screw 15 is rotated which causes the nut 16 to travel, which again through the links 17 causes the wings to turn on the pivots 4. Although it would be possible, with suitable gearing, to turn the wings by hand it is more feasible to use the available motor power which is provided for driving the propeller of the airplane.

The propeller 22 is driven by the motor 23 which is mounted to the fuselage structure and under the cowling 24. An auxiliary shaft 25 (Figure 14), which may be connected direct or by gearing to the crank shaft of the motor, carries a conical friction wheel 26. At right angles to the aforesaid shaft another shaft 27 is mounted in bearings 28 and 29 carried by a framework 30 which is supported by the fuselage structure. On the shaft 27 is mounted a sleeve 31, which carries two conical friction wheels, one 32 above and one 33 below said friction wheel 26. The shaft 27 may be moved up or down along its axis and will then bring one or the other of the two friction wheels mounted on the sleeve into engagement with said friction wheel 26 which will cause the shaft 27 to rotate in one or the other direction. The motion of the shaft 27 is transmitted through the bevel gears 34 and 35 to the shaft 36 which is mounted in bearings 37. Shaft 36 carries a sprocket 38 which transmits the motion of the shaft through the chain 39 to the sprocket 40 which is carried by the screw 15. The screw 15 is journaled in bearings 41 and 42 which are carried by the fuselage structure. Thrust bearings 43 and 44 are provided to take up longitudinal stresses in the screw. To keep the friction wheels normally out of engagement a spring 45 is interposed between the bearing 28 and a collar 46 on the shaft 27. A ball bearing 47 is interposed between the spring 45 and the bearing 27. To throw the friction wheels into and out of engagement the following arrangement is provided. Near the pilot's seat are arranged two vertical rods or tubes 48 and 49 which at their upper ends are provided with operating handles 50 and 51. The lower end of each one of said rods is joined to a pair of toggles. The one link of each pair of toggles 52 and 53 are joined to fixed pivots 54 and 55, the other links 56 and 57 are joined to a common pivot on a lever 58 fulcrumed at 59. This lever 58 is connected by a link 60 to a bell crank lever 61, which again is connected through a link 62 to a lever 63. The one end of lever 63 engages stud 64 on the collar 65 which is loosely mounted on the shaft 27 and between the two thrust ball bearings 66 and 67. Above the upper and below the lower friction wheel are mounted helical compression springs 68 and 69 around the shaft 27, the compression of which can be adjusted by the nuts 70 and 71. Attached to the operating handles 50 and 51 and extending upwards are two rods 72 and 73. Below the screw 15 is mounted a rod 74 on which slides an extension 75 of the nut 16. On this rod is mounted an arm 76 which protrudes horizontally through slots 77 and 78 in the rods 72 and 73. The arm 76 is provided with a cam 79 and is guided by bearings 80 and 81. The rod 74 is held in normal position by the two helical springs 82 and 83 which rest with one end of each against the bearings 84 and 85 and with their other ends against an adjustable collar 86 and the boss 87 of the arm 76. The rods 72 and 73 are guided by the bearings 88 and 89. Stops 90 and 91 are provided for the toggles.

The action of the described mechanism is as follows: When it is desired to turn the wings 3 back so as to increase the speed of the airplane, the handle 50 is depressed by the pilot as indicated in dash and dotted lines, Figure 14, until the toggle 56 rests against the stop 90. This moves lever 58 as shown and pulls the link 60, turns the bellcrank lever 61, pulls the link 62, turns the lever 63, moves the collar 65 and by the way of the thrust bearing 69 and the compression spring 68 forces the friction wheel 32 into contact with the friction wheel 26 which continuously rotates with the motor. This causes the friction wheel 32 and the shaft 27 to rotate. To the lower end of the shaft 27 is keyed the bevel gear 34 but so that shaft 27 can slide up and down in the gear which is mounted in the bearing 29 and held in position by the member 92. The bevel gear 34 which turns with the shaft 27 meshes with the bevel gear 35 and turns the shaft 36, which through the sprocket 38, chain 39 and sprocket 40 turns the screw 15. The nut 16 now moves forward and through the links 17 turns the wings 3 back on the pivots 4. Unless the handle 50 is pulled back to its normal position, the screw will continue to rotate until the extension 75 on the nut 16 strikes the boss 87 of the arm 76. This will advance the cam 79 which will engage the upper edge of the slot 77 in rod 72 (which is now in a downward position) and force the rod 72 to move up and thereby pulling the toggles 52 and 56 into their normal position. It is obvious that this will cause the lever 58 to move forward and through the link 60, bell crank lever 61, link 62 and lever 63 disengage the friction wheel 32 from the friction wheel 26 whereby the whole mechanism and the wings come to rest. By depressing the other handle 51, the lower friction wheel 33 will move into contact with the friction wheel 26 and a reversed movement will take place causing the wings 3 to swing forward until the extension 75 strikes the collar 86 on the rod 74. This will move the cam 79 until it strikes the upper edge of slot 78 on the rod 73 causing it to move upwards resulting in the disengagement of the friction wheel 33 from the friction wheel 26 thereby bringing the whole mechanism and the wings 3 to rest. The stops 90 and 91 are so placed that on depressing the toggles they will move over the dead center and will stay down without the necessity of holding the handle down by the hand.

As the wings 3 move it is obvious that the magnitude and position of the resultant of the lifting force on the wings change, and if no means were provided to counteract this change the aerodynamical balance of the airplane would be upset. For this reason means are provided to adjust the lift of the stabilizer 93, which depends on the angle at which the stabilizer is set to the horizontal, that is the so called angle of incidence. A coventional way of adjusting the angle of incidence of the stabilizer is shown in Figures 8, 15 and 16.

The rear edge of the stabilizer is pivoted at 94, and the leading edge can be moved up or down by supporting the front spar 95 on two vertical screws 96 which rest in nuts 97 and are guided in bearings 98. The nuts carry sprockets 99 which are rotated by chains 100. To enable the angle of incidence to be adjusted automatically as the wings 3 move, a worm gear is provided, consisting of the worm 101 driven by the shaft 36 through a universal joint 102 and engaging normally a worm wheel 103. This worm wheel is carried by a shaft 104 which also carries a sprocket 105 which through a chain 106 and cables 107 (Figure 7) transmits motion to the chain 100, sprockets 99 and nuts 97. The nuts 97 are guided in bearings 108. The worm gear, sprockets and screws are so proportioned and set that the front of the stabilizer will move up or down and to such a degree as to counteract as nearly as possible the change in magnitude and position of the resultant air pressure on the wings. However it may be necessary to manually further correct the angle of incidence and for this purpose the free end of the worm is joined by a universal joint 109 to a shaft 110 which is journaled in a bearing 111. This bearing is carried by a vertical post 112 which can slide up or down in bearing 113. A lever 114 fulcrumed at 115 is connected with one end through a link 116 to the aforesaid post 112. The other end of the lever forms a handle which when depressed as shown in dash and dotted lines will through the link 116 lift the bearing 111 and move the worm 101 out of engagement with the worm wheel 103. Now it is possible to turn the shaft 104 freely by hand and this is accomplished by mounting another sprocket 117 on the shaft 104 and connecting the same by a chain 118 to a sprocket 119. This is mounted together with a hand wheel 120 which will enable the pilot to adjust the stabilizer at will. To ensure that the worm remains in or out of engagement with the worm wheel, a spring 121 is provided which pulls on the end of the lever 114 either on the one or the other side of the fulcrum thereby tending to keep the handle of the lever pressed against the one 122 or the other stop 123.

The struts 5, 6 and 7 consist of the internal stress members 130, 131, and 132 respectively and the streamlined fairings 133, 134 and 135 respectively, Figures 12 and 13. The fairings rest on the shoulders 136 and fit loosely so as to turn with the wind pressure.

The mechanism described is shown in the drawings in conjunction with an airplane having the upper wings movable and the lower wings fixed, but it may of course be equally well applied to an airplane with the lower wings movable and the upper wings fixed as shown in Figure 18, or to an airplane with movable wings mounted above and below a set of fixed wings as shown in Figure 19, which may be used for large multimotored airplanes as shown.

In completing this specification, 124 is the rudder, 125 the vertical fin, 126 the elevators and 127 the ailerons. 128 is the usual landing gear and 129 the tail skid wheel.

I claim:

1. An airplane having the combination of a body, two sets of wings for supporting said body, one set of which has a fixed position in relation to the body, the other set of wings being mounted so as to enable said set of wings to be turned on vertical pivots during flight into any desirable position relatively to the body, means for turning the movable wings, a stabilizer, mounted on said body for movement to change the angle of incidence thereof and means for adjusting the angle of incidence of said stabilizer by the movement of the movable wings.

2. An airplane having the combination of a body, two sets of wings for supporting said body, one set of which has a fixed position in relation to the body, the other set of wings being mounted so as to enable said set of wings to be turned during flight into any desirable position relatively to the body, pivots for said wings to turn on, a screw mounted in bearings on said body, a nut mounted on said screw, links connecting said nut with the pivoted wings, and means for turning said screw.

3. An airplane having the combination of a body, two sets of wings for supporting said body, one set of which has a fixed position in relation to the body, the other set of wings being mounted so as to enable said set of wings to be turned during flight into any desirable position relatively to the body, pivots for said wings to turn on, a screw mounted in bearings on said body, a nut mounted on said screw, links connecting said nut with the pivoted wings, means for turning the screw, and means for starting, stopping or reversing the motion of the screw.

4. An airplane having the combination of a body, a wing, alined pivots for said wing, said pivots having fixed positions in relation to said body, said wing being connected with one of said pivots by a universal joint, struts, a fitting mounted to turn on the second of said pivots, one end of each strut being connected with said wing, and the other end of the strut being connected with said fitting, the provision and arrangement being such as to prevent any binding or undue stress being put on the pivots due to the load flexure of the wing.

5. An airplane having the combination of a body, wings mounted so as to enable them to be turned during flight into any desirable position relatively to the body, a stabilizer mounted on said body for movement to change the angle of incidence of said stabilizer, means to change the angle of incidence of the stabilizer, power means to move said wings, and means to couple the power means to said first mentioned means, to cause the movement of said wings and stabilizer in unison by the operation of said power means, for the purpose of changing the aerodynamic balance of the airplane.

6. An airplane having the combination of a body, main lifting wings mounted on said body for movement to different angular positions with respect to said body, stabilizers mounted on said body for movement to change the angles of incidence thereof, power driven mechanism to move said wings and stabilizers in unison to change the aerodynamic balance of the airplane, said mechanism including provision to control the operation of said mechanism, and manually operable provision to move said stabilizers only, to change the angles of incidence thereof, regardless of the angular positions of said wings.

7. An airplane having the combination of a body, main lifting wings each having its inner end pivotally connected with said body so as to be movable from an extended position substantially perpendicular to the longitudinal axis of said body to a position substantially paralleling said axis, horizontal stabilizers mounted on said body for movement to change the angles of incidence thereof, power driven mechanism to move said wings and stabilizers in unison to change the aerodynamic balance of the airplane, said mechanism including provison to control the operation of said mechanism, and manually operable provision to move said stabilizers only, to change the angles of incidence thereof.

IVAN ANDERSSON.